2 Sheets—Sheet 1.

C. WHIPPLE.

Machine for Shaving Heads of Wood Screws.

No. 686.

Reissued April 12, 1859.

N. PETERS, Photo-Lithographer, Washington, D. C.

C. WHIPPLE.
Machine for Shaving Heads of Wood Screws.
No. 686. Reissued April 12, 1859.
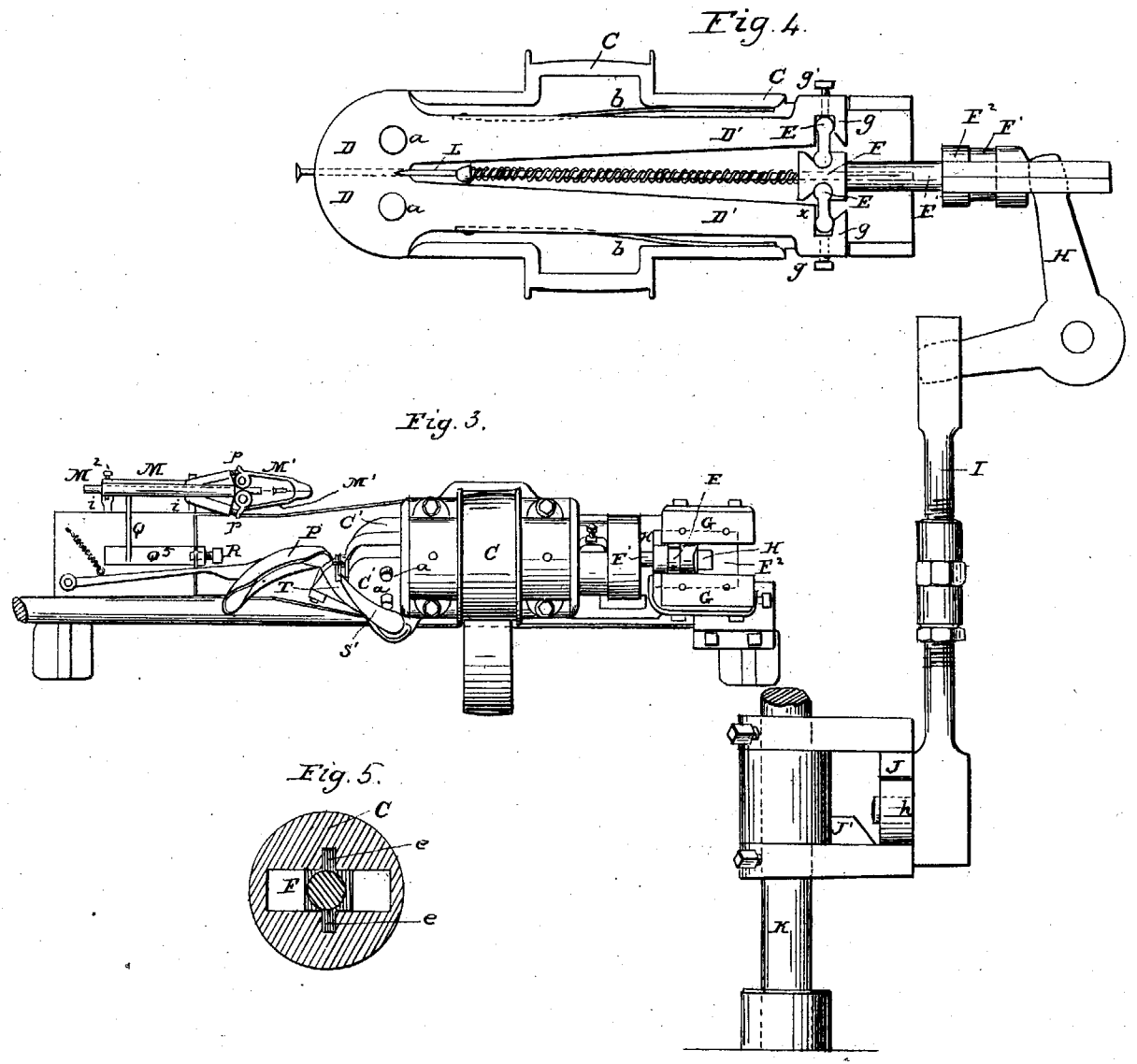
N. PETERS, Photo-Lithographer, Washington, D. C.

UNITED STATES PATENT OFFICE.

CULLEN WHIPPLE, OF PROVIDENCE, RHODE ISLAND, ASSIGNOR TO THE NEW ENGLAND SCREW COMPANY.

IMPROVEMENT IN MACHINERY FOR MAKING WOOD-SCREWS, &c.

Specification forming part of Letters Patent No. 9,460, dated December 7, 1852; antedated June 7, 1852; Reissue No. 686, dated April 12, 1859.

*To all whom it may concern:*

Be it known that CULLEN WHIPPLE, of the city and county of Providence, in the State of Rhode Island, did invent a new and useful Improvement in Machinery for the Manufacture of Wood-Screws, of which the following is a full, clear, and exact description, reference being had to the annexed drawings, which make part of this specification, and in which—

Figure 2:
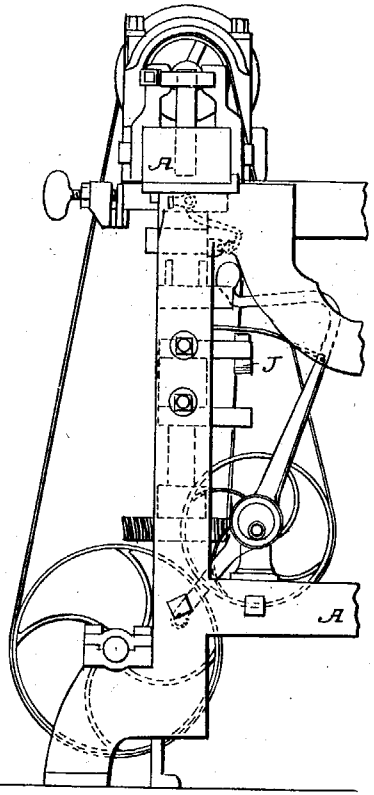
Figure 1:
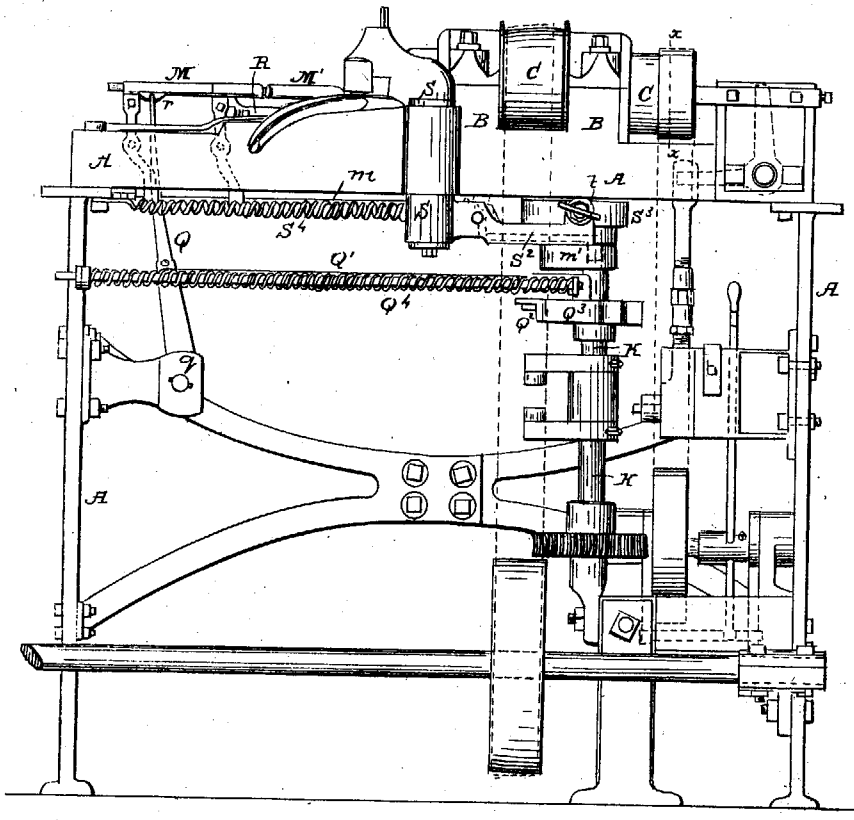

Figure 1 represents a side elevation, Fig. 2 an end elevation, and Fig. 3 a plan, of a machine for shaving the heads of wood-screws, (complete with the exception of the hopper and its adjuncts,) showing one application of said improvement. Fig. 4 represents on an enlarged scale the mandrel in section, together with an elevation of the mechanism connected therewith for holding and liberating and for discharging the blank; and Fig. 5 represents a transverse section through the rear of the mandrel at the line *x x* of Fig. 1.

The invention which is the subject of this patent consists of a mandrel fitted with a chuck or gripping-jaws for holding screw-blanks in any of the operations of dressing or finishing them, in combination with a rod or punch actuated by a spring for discharging the dressed blank from the chuck, both the spring and punch being carried by the mandrel, and therefore at all times in place and ready to act in whatever position the mandrel may be held or whatever movements may be given it, and the spring actuating the punch without thrusting the mandrel on its bearings while the blank is under the action of the cutter.

One application of this improvement is shown in the machine represented in the drawings, in Fig. 4 of which C represents in section a hollow revolving mandrel carrying two gripping-jaws or chucking-nippers, D D, for chucking the blank. These nippers turn on joint-pins *a a*, and have shanks made long to give them slight elasticity and the requisite leverage. These shanks D′ D′ are pressed toward each other to open the jaws of the nippers by springs *b b*. The jaws are closed by forcing the shanks apart by means of toggle-levers E E, the traversing-block F of which is guided (as shown in Fig. 5) by its arms *e e*, which slide in grooves in the mandrel. This block forms the head of a bar, F′, whose axis is in line with that of the mandrel and whose hinder extremity is swiveled to a cross-head, $F^2$, and it is through this cross-head (actuated by the elbow-lever H, bar I, and cams J J′, on the revolving shaft K) that the motion is communicated to the block F, by which the toggles are alternately flexed and extended. When the bar F′ is moved backward, the toggles E E are flexed, and allow the springs *b b* to force the shanks of the nippers toward each other to open the jaws D D, and when the bar F′ is moved forward the toggles will be extended to separate the shanks D′ D′ and close the jaws firmly upon a blank placed between them. This forward movement of the bar F′ is continued until the toggles are pushed slightly beyond a straight line, where they rest against the stops *x x* on the shanks D′ D′, in which position they stand locked to hold the shanks separated and the jaws firmly closed upon the blank, without any tendency to produce endwise pressure of the mandrel against its bearings, the elasticity of the nipper-shanks D′ D′ preventing the grasp of the jaws upon the blank from being relaxed when the toggles are thus pushed beyond a straight line.

The mechanism for discharging the blank after it has been shaved or otherwise operated on consists of a rod or punch, L, whose front extremity is supported and guided in the same grooves in which the blank is held in the jaws of the nippers D D. The hinder extremity of this rod enters a socket in the head-block F, which supports and guides it. A collar or stop is formed toward the front end of the punch, which, coming into contact with the inner end of the jaws, prevents the end of the punch from reaching quite to the front ends of the grooves in the jaws when the blank is discharged, thus leaving an opening in the front end of the groove to receive and guide the end of the blank when fed into the groove against the pressure of the spring of the discharging-punch. A spring coiled on the punch between the collar and the head-block F constantly tends to force the punch forward in the grooves in the gripping-jaws. When an undressed blank is fed in between the jaws from a feeding apparatus, (which need not be described here, as it forms no part of the claim under this patent,) it pushes back the punch L, compressing its spring, and when the blank, after being dressed, is released from the grasp of the nippers it is instantly expelled by the punch, which is driven forward again by the reaction of the spring. While the toggles stand extended and locked against the stops or holdfasts *x x* to keep the blank clamped fast in the jaws, the elasticity of the nipper-shanks presses the toggles forward upon these stops with force sufficient to maintain the compression of the discharging-spring. In relation, therefore, to this spring, the block F may be regarded as an attachment to the mandrel or one of the jaw-shanks, for it operates as a support for the spring, and as a support and guide for the discharging-punch, with the same practical effect as a separate block or bracket attached to the inside of the mandrel or to one of the shanks, the spring having a sufficient range of motion to act efficiently in any position within the range of motion of the block.

What is claimed under this patent as the invention of the said CULLEN WHIPPLE is—

The spring discharging-punch, in combination with the mandrel and gripping-jaws, when the punch and spring are both carried by the mandrel, substantially as herein set forth.

In testimony whereof the said company has hereunto signed its name and affixed its seal.

NEW ENGLAND SCREW COMPANY. [L. S.]

By HENRY L. KENDALL,

*Agent.*

Witnesses:

P. H. WATSON,

HENRY BALDWIN, Jr.